(12) United States Patent
Hoffman

(10) Patent No.: US 10,539,336 B2
(45) Date of Patent: Jan. 21, 2020

(54) SERVER-BASED THERMOSTAT CONTROL

(71) Applicant: RCS Technology, LLC, Poway, CA (US)

(72) Inventor: Michael Hoffman, San Diego, CA (US)

(73) Assignee: RCS Technology, LLC, Poway, CA (US)

( * ) Notice: Subject to any disclaimer, the term of this patent is extended or adjusted under 35 U.S.C. 154(b) by 16 days.

(21) Appl. No.: 15/940,470

(22) Filed: Mar. 29, 2018

(65) Prior Publication Data

US 2019/0301763 A1    Oct. 3, 2019

(51) Int. Cl.
| | |
|---|---|
| *F24F 11/47* | (2018.01) |
| *G05B 19/042* | (2006.01) |
| *F24F 11/54* | (2018.01) |
| *F24F 11/58* | (2018.01) |
| *F24F 11/64* | (2018.01) |
| *F24F 11/65* | (2018.01) |
| *F24F 140/60* | (2018.01) |
| *F24F 110/10* | (2018.01) |
| *F24F 110/12* | (2018.01) |
| *F24F 130/10* | (2018.01) |

(52) U.S. Cl.
CPC .............. *F24F 11/47* (2018.01); *F24F 11/54* (2018.01); *F24F 11/58* (2018.01); *F24F 11/64* (2018.01); *F24F 11/65* (2018.01); *G05B 19/042* (2013.01); *F24F 2110/10* (2018.01); *F24F 2110/12* (2018.01); *F24F 2130/10* (2018.01); *F24F 2140/60* (2018.01); *G05B 2219/2614* (2013.01)

(58) Field of Classification Search
None
See application file for complete search history.

(56) References Cited

U.S. PATENT DOCUMENTS

| | | | |
|---|---|---|---|
| 9,810,442 B2 * | 11/2017 | Matsuoka .......... | G05D 23/1904 |
| 10,030,878 B2 * | 7/2018 | Nemcek ................. | G05B 15/02 |
| 10,088,853 B2 * | 10/2018 | Kolavennu ......... | G05D 23/1917 |
| 2011/0290893 A1 * | 12/2011 | Steinberg ................. | F24F 11/30 |
| | | | 236/49.3 |
| 2012/0023225 A1 | 1/2012 | Imes et al. | |
| 2013/0274928 A1 * | 10/2013 | Matsuoka .......... | G05D 23/1904 |
| | | | 700/276 |
| 2014/0277761 A1 * | 9/2014 | Matsuoka .......... | G05D 23/1904 |
| | | | 700/276 |
| 2015/0163945 A1 * | 6/2015 | Barton ................... | G05B 15/02 |

(Continued)

OTHER PUBLICATIONS

ISA/US, Int. Search Report and Written Opinion issued on PCT application No. US19/23705, dated Jun. 14, 2019, 17 pages.

*Primary Examiner* — Ramesh B Patel
(74) *Attorney, Agent, or Firm* — Greenberg Traurig, LLP

(57) ABSTRACT

A system, method and apparatus for remote control of a thermostat by a network-based server, when the thermostat is not connected to a local or wide-area network. A network-based server calculates a modified temperature profile for a thermostat based on a utility's time-of-use pricing and/or weather forecasts. After the server has calculated the modified temperature profile, it is provided to a mobile device via a wide-area network, and the mobile device provides the modified temperature profile directly to the thermostat when the mobile device is within range of the thermostat.

19 Claims, 5 Drawing Sheets

(56) References Cited

U.S. PATENT DOCUMENTS

2016/0305681 A1\* 10/2016 Matsuoka .......... G05D 23/1904
2017/0045864 A1    2/2017 Fadell et al.
2018/0087795 A1\*  3/2018 Okita ....................... F24F 11/30

\* cited by examiner

FIG. 5

500 – Provide Initial Information to Server

502 – Create Account – Store Initial Information

504 – Receive time-of-use pricing information

506 – Receive Weather Information

508 – Program Thermostat

510 – Provide Temperature Profile to Server

512 – Provide Historical Data to Server

514 - Determine Modified Temperature Profile

516 – Provide Modified Temperature Profile to Mobile Device

518 – Receive/Store Modified Temperature Profile

520 – Determine Mobile Device Within Range of Thermostat

522 - Provide Modified Temperature Profile to Thermostat

524 – Receive Historical Information from Thermostat

526 – Provide Historical Information to Server

SERVER-BASED THERMOSTAT CONTROL

BACKGROUND

I. Field of Use

The present application relates generally to the heating, ventilation and air conditioning arts. More specifically, embodiments of the present invention relate to remote control of thermostats by a cloud-based server.

II. Description of the Related Art

Thermostats have been used for decades to control room temperatures based on user settings and temperature sensors commonly built into the thermostats. Thermostats typically control heating and/or cooling equipment (HVAC) by turning the equipment on or off. For example, when a room temperature where a thermostat is located drops below a setpoint, the thermostat sends a signal to heating equipment to begin heating the room. When the setpoint has been achieved or exceeded, the thermostat sends another signal to the heating equipment to turn off.

As wireless communication technology and microprocessors have become widespread, modern thermostats can be accessed by smart phones or tablet computers in order to define temperature profiles, to set temperatures on demand, and to receive status information. Typically, such wireless communication technology comprises one or more variations of the IEEE 802.11 standard, commonly known as Wi-Fi.

While such modern thermostats are convenient, they typically require a local Wi-Fi network in order for communications to occur. Many households in the United States, and a far greater number in other parts of the world, do not have such Wi-Fi networks, because they may not have access to the Internet, either because of financial issues or simply that the necessary public infrastructure is either non-existent.

It would be desirable, therefore, for thermostats to be able to communicate with mobile devices without the need for a local-area network.

SUMMARY

Embodiments of the present invention are directed towards a system, method and apparatus for remotely controlling a thermostat when the thermostat is not in direct communication with a local or wide-area network. In one embodiment, a server is described, comprising a memory for storing time-of-use pricing information, a temperature profile and processor-executable instructions, wherein the time-of-use pricing information comprises energy pricing for one or more time periods, a network interface for communicating with a mobile device over the wide-area network, the mobile device associated with the thermostat, and a processor coupled to the memory and the network interface, for executing the processor-executable instructions that causes the server to determine a predicted outdoor temperature where the thermostat is located, modify the temperature profile based on the time-of-use pricing information and the predicted outdoor temperature to produce a modified temperature profile, and provide the modified temperature profile to the mobile device associated with the thermostat for the mobile device to provide the modified temperature profile to the thermostat.

In another embodiment, a mobile device is described, comprising a memory for storing modified temperature profile and processor-executable instructions, the modified temperature profile for replacing a temperature profile stored by the thermostat, a network interface for receiving a modified temperature profile from a remote server over a wide-area network, low-power communication circuitry for communicating directly with the thermostat, and a processor coupled to the memory, the network interface and the low-power communication circuitry, for execution of the processor-executable instructions that causes the mobile device to receive, by the processor via the network interface, the modified temperature profile from the remote server, determine, by the processor, that the mobile device is within range of the thermostat, and provide, by the processor via the low-power communication circuitry, the modified temperature profile to the thermostat when the mobile device is in range of the thermostat.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 5 is a flow diagram of one embodiment of a method, performed by the thermostat, server and mobile device shown in FIG. 1 for controlling the thermostat over a wide-area network.

DETAILED DESCRIPTION

Embodiments of the present invention are directed towards a system, device and method to automatically program a thermostat that is not connected to a local-area network, such as a home Wi-Fi network. One or more temperature profiles are received from a remote server by a mobile device over a wide-area network, such as the Internet, and provided to the thermostat when the mobile device determines that it is in range of the thermostat. The temperature profiles are optimized to reduce the cost of heating/cooling a residence when time-of-use pricing is in effect. In one embodiment, the temperature profiles are also optimized for anticipated predicted outdoor temperatures.

Figure 1:
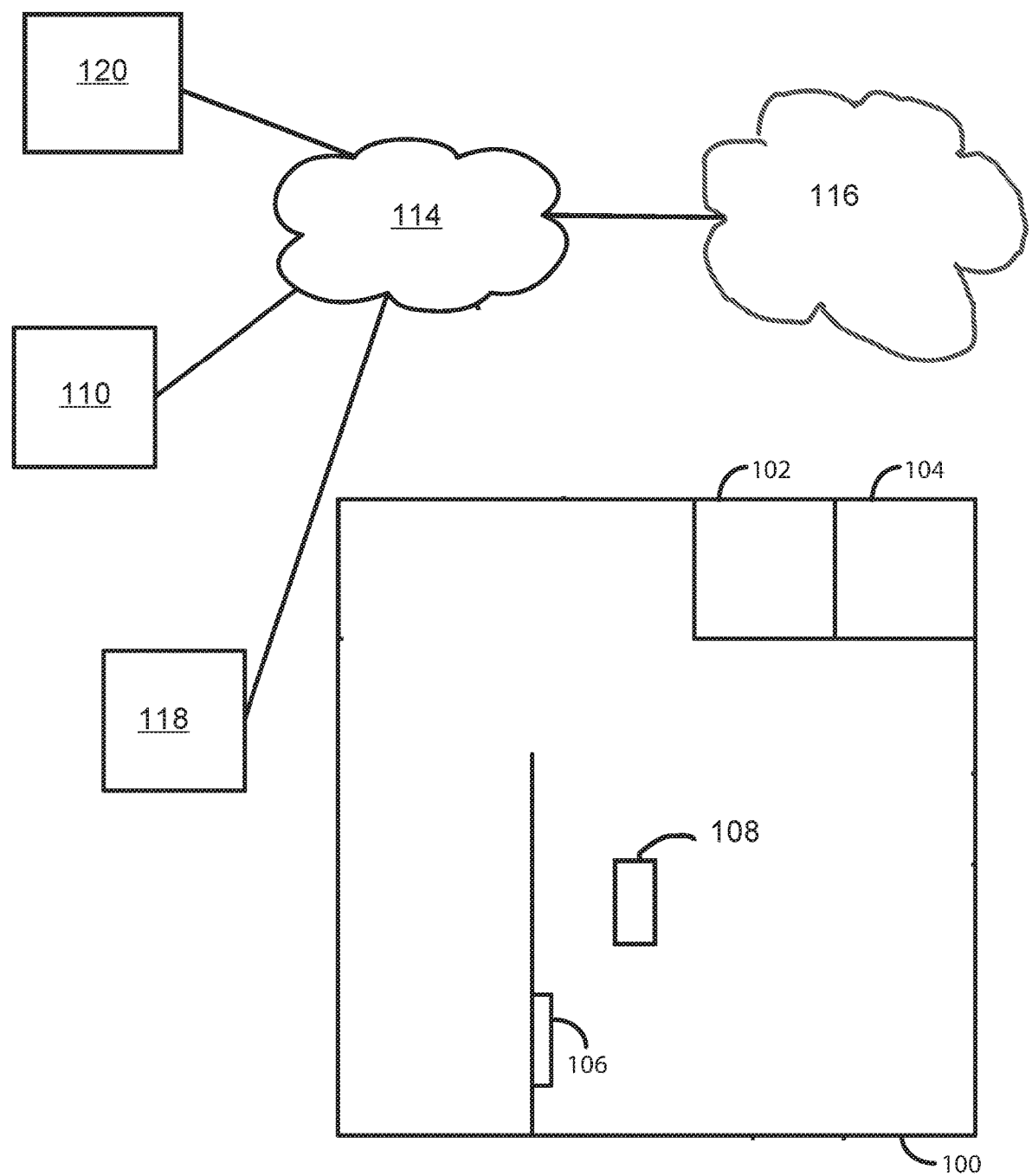
FIG. 1 is a top, plan view of a structure utilizing the inventive concepts discussed herein.

FIG. 1 is a top, plan view of a structure 100 utilizing the inventive concepts discussed herein. In this embodiment, structure 100 comprises a multi-room, single-story residence having a heating system 102, a cooling system 104 and a thermostat 106 that controls heating system 102 and cooling system 104. Thermostat 106 comprises a temperature sensor that senses the ambient temperature of the room where thermostat 106 is located. In some embodiments, thermostat may be configured to receive two or more temperature sensor inputs from temperature sensors located in other parts of structure 100.

Like prior art thermostats, thermostat 106 may be programmable to execute one or more temperature profiles in the form of desired temperature setpoints and times when these setpoints should be achieved. For example, a user may set thermostat 106 to warm structure 100 to an ambient temperature of 74 degrees Fahrenheit at 7 am when the user typically wakes, to maintain a temperature of no less than 62 degrees at 8:30 am when the user leaves structure 100 to go to work, to set the temperature to 74 degrees Fahrenheit at 6 pm when the user returns from work, and to maintain the temperature of no less than 60 degrees Fahrenheit at 10 pm when the user typically goes to bed. As each of the times set by the user in the temperature profile near, thermostat 106 sends signals to heating system 102 or cooling system 104 to begin or stop heating or cooling, depending on the temperature setpoint for each setpoint time (i.e., waking, leaving, returning, retiring) and the ambient air temperature in the room where thermostat 106 is located.

To achieve the temperature setpoints at the times specified in the temperature profile, thermostat 106 typically begins heating or cooling before the set time for each temperature setpoint. In this way, the desired room temperature will be achieved at the time desired by the user. This is known in the art as "temperature ramping", "thermal ramping" or simply, "ramping". Prior art thermostats may be pre-programmed to begin ramping a predetermined, fixed time period before each setpoint time, such as 15 minutes or 30 minutes.

While many modern-day thermostats offer Internet connectivity, many do not. In addition, while most households in the United States have a local-area network installed, such as a home Wi-Fi network, many other households do not. In these cases, thermostat 106 is not capable of sending or receiving information via a local or wide-area network, such as the Internet. However, thermostat 106 may be capable of wireless communications directly with a mobile device 108, such as a smart phone or tablet computer, using another form of wireless communications, such as Bluetooth Low Energy (BLE) or near-field communications (NFC). Using such direct communications allows thermostat 106 to receive wireless information, such as setup information and temperature profiles from mobile device 108 when mobile device 108 is within range of thermostat 106, and also to provide historical information to mobile device 108.

Mobile device 108 may be in communication with server 110 via a local-area network, such as a home Wi-Fi router and modem, and a wide-area network 114, such as the Internet, or it may be in "direct" communication with server 110 via a cellular network 116. Server 110 may be used to automatically provide temperature profiles to mobile device 108, which may then, in turn, provide them to thermostat 106 when mobile device 108 is within range of thermostat 106. Moreover, server 110 may be capable of receiving information from thermostat 106, such as past temperature readings and/or other information, by relaying such information to mobile device 108 when mobile device 108 is within range of thermostat 106, whereupon mobile device 108 may provide this information to server 110 via data and/or cellular networks mentioned above.

Server 110 may be coupled to a weather server 112 to determine past, current and predicted weather conditions in a large number of geographical regions, including a region where structure 100 is located. Such past, current and predicted weather information may comprise past, current and predicted predictions of outdoor temperatures, precipitation predictions, wind speed and direction, cloud coverage, and other past, current and predicted weather-related information.

Server 110 may be programmed with time-of-use pricing information in effect for one or more utilities. Time-of-use pricing is a new type of utility billing structure, where rates vary not only on how much resources are consumed by structure 100, but also on when such resources are consumed. For example, a utility 120, coupled to server 110 via wide-area network 114, may set electricity time-of-use rates at $0.14 per kilowatt-hour for electricity consumed between 4 am and 4 pm, $0.21 per kilowatt-hour for electricity consumed between 4 pm and 9 pm, and $0.12 per kilowatt-hour for electricity consumed between 4 am and 4 pm. Server 110 may use the time-of-use pricing information, in conjunction with past usage data, past or current weather conditions, and/or predicted weather forecasts, to generate temperature profiles that will result in the lowest cost to the homeowner. Such temperature profiles may then be provided to mobile device 108 and then relayed to thermostat 106 when mobile device 108 is within range of thermostat 106. It should be understood that the term "temperature profile", as used herein, may refer to all temperature setpoints, starting and stopping times that define a temperature profile, or it can refer to a single profile attribute, such as a single temperature setting, a single temperature setting, a single ramp start time, etc. It should be understood that in some embodiments, the functionality of server 100 may be provided by utility 120.

Figure 2:
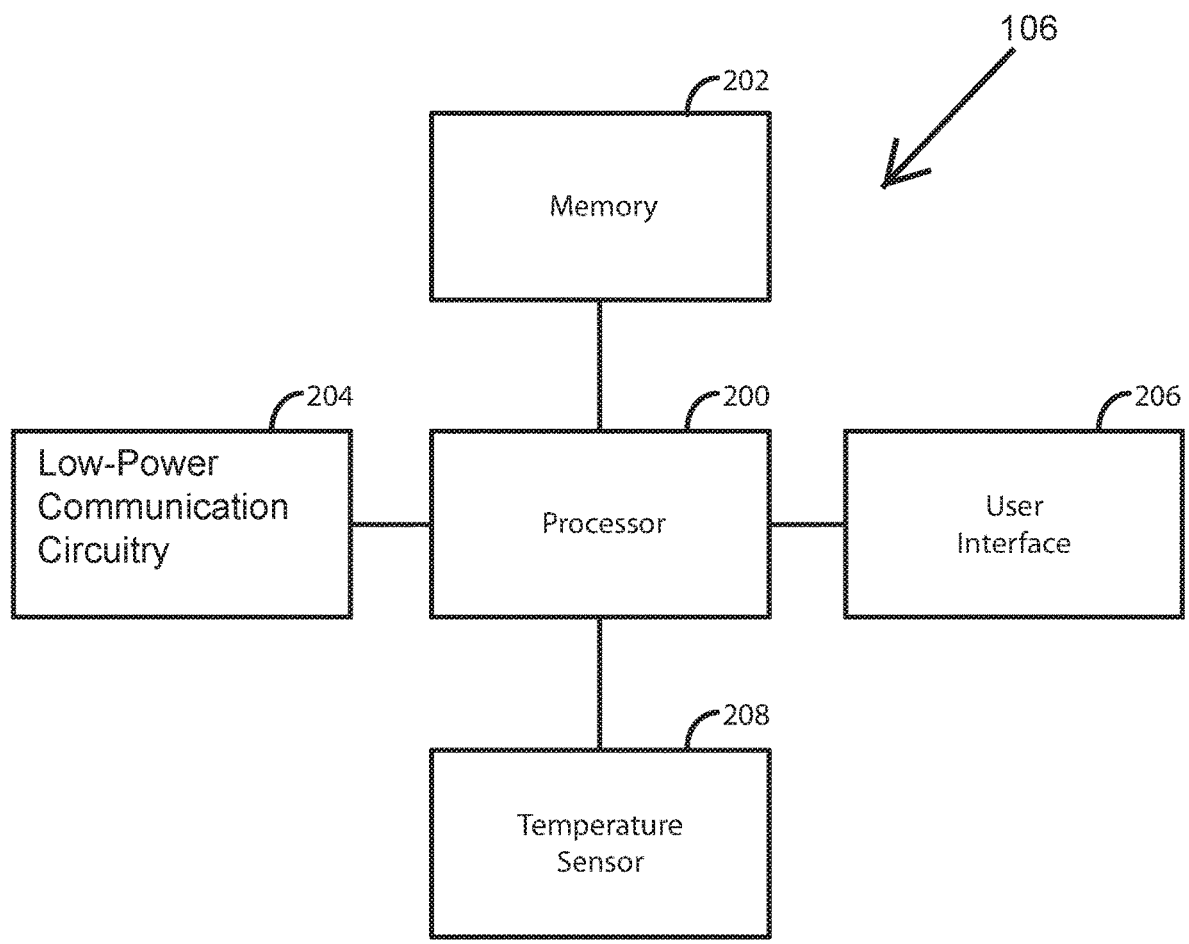
FIG. 2 is a functional block diagram of one embodiment of thermostat as shown in FIG. 1.

FIG. 2 is a functional block diagram of one embodiment of thermostat 106. FIG. 2 shows processor 200, memory 202, low-power communication circuitry 204, user interface 206, and temperature sensor 208. It should be understood that in some embodiments, some functionality has been omitted for purposes of clarity, such as a power supply.

Processor 200 comprises one or more general-purpose microprocessors, microcontrollers and/or custom or semi-custom ASICs, and/or discrete components able to carry out the functionality required for operation of thermostat 106. Processor 200 may be selected based on processing capabilities, power-consumption properties, and/or cost and size considerations. In the case of a microprocessor, microcontroller, or ASIC, processor 200 generally executes processor-executable instructions stored in memory 202 that control the functionality of the intelligent personal assistant.

Memory 202 one or more non-transitory information storage devices, such as RAM, ROM, EEPROM, UVPROM, flash memory, SD memory, XD memory, or other type of electronic, optical, or mechanical memory device. Memory 202 is used to store processor-executable instructions for operation of mobile device 108, as well as any information used by mobile device 108, such as temperature profiles, historical temperature readings, humidity levels, occupancy status, etc. It should be understood that in some embodiments, a portion, or all of, memory 202 is incorporated into processor 200 and, further, that memory 202 excludes media for propagating signals.

Low-power communication circuitry 204 comprises electronic circuitry necessary to communicate directly, and wirelessly, with mobile device 108, i.e., without the use of an intermediary system such as a home Wi-Fi network. Such communication circuitry 204 may comprise one or more discreet components, integrated circuits, ASICs, or other circuitry well-known in the art for low-power communications directly with mobile device 108, such as BLE, NFC, or other well-known communication circuitry.

User interface 206 comprises one or more keys, buttons, switches, touchpads, touchscreens, or other devices that allows a user to operate thermostat 106, and to enter information that may be used by thermostat 106, such as a location of structure 100, a square footage of structure 100, an age of structure 100, a number of stories that structure 100 has, etc.

Temperature sensor 208 comprises a device that provides electronic signals to processor 200 in accordance with the ambient air temperature surrounding thermostat 106. In some embodiments, temperature sensor 208 is not used, and thermostat 106 receives temperature readings from one or more temperature sensors located in one or more locations of structure 100. Temperature sensor 208 may comprise one of a thermistor, a resistive temperature detector, a thermocouple, semiconductor-type devices, or other temperature sensors known in the art.

Figure 3:
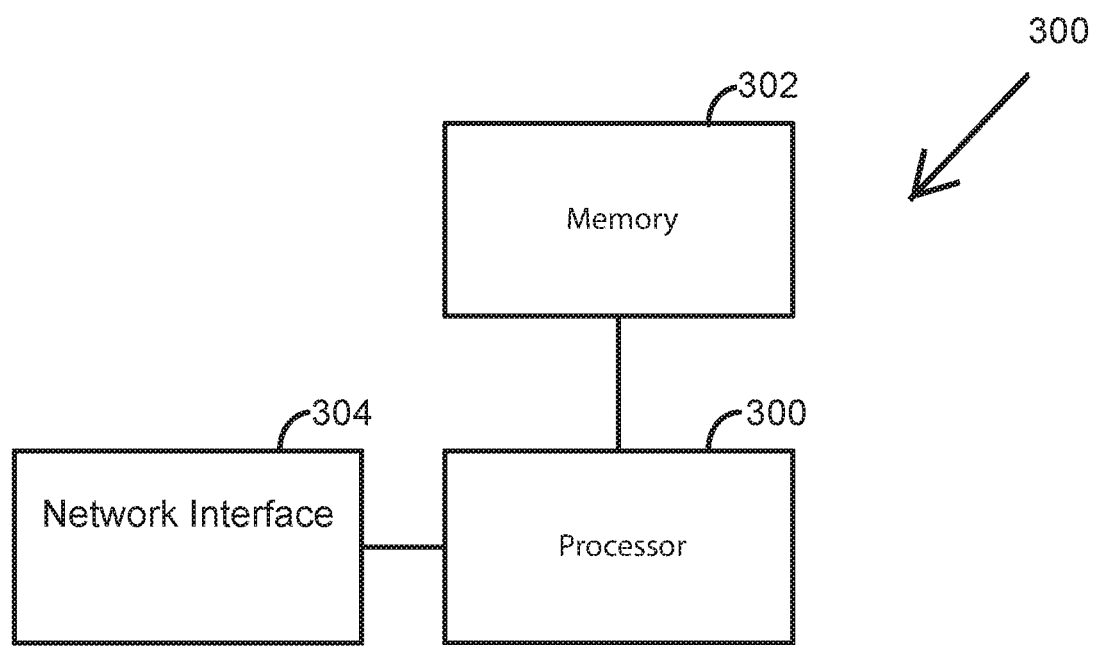
FIG. 3 is a functional block diagram of one embodiment of a server as shown in FIG. 1.

FIG. 3 is a functional block diagram of one embodiment of server 300, comprising processor 300, memory 302, and network interface 304.

Processor 300 is configured to provide general operation of server 300 by executing processor-executable instructions stored in memory 302, for example, executable code. Processor 300 typically comprises a general-purpose processor, such as an i5 processor manufactured by Intel Corporation of Santa Clara, Calif., although any one of a variety of microprocessors, microcomputers, and/or microcontrollers may be used alternatively.

Memory 302 comprises one or more information storage devices, such as RAM, ROM, EEPROM, UVPROM, flash memory, SD memory, XD memory, or other type of electronic, optical, or mechanical memory device. Memory 302 is used to store processor-executable instructions for operation of server 300, as well as any information used by server 110, such as user account information (including names, addresses, thermostat makes and models, billing information, contact information, etc.), time-of-use pricing information from one or more utility providers (i.e., gas, electric, water), and past, current and predicted weather information (such as past and/or current weather conditions and predicted temperatures, humidity, wind speed and direction, etc.).

Network interface 304 comprises circuitry necessary for processor 300 to communicate over one or more networks, such as wide-area network 114. Such circuitry is well known in the art.

Figure 4:
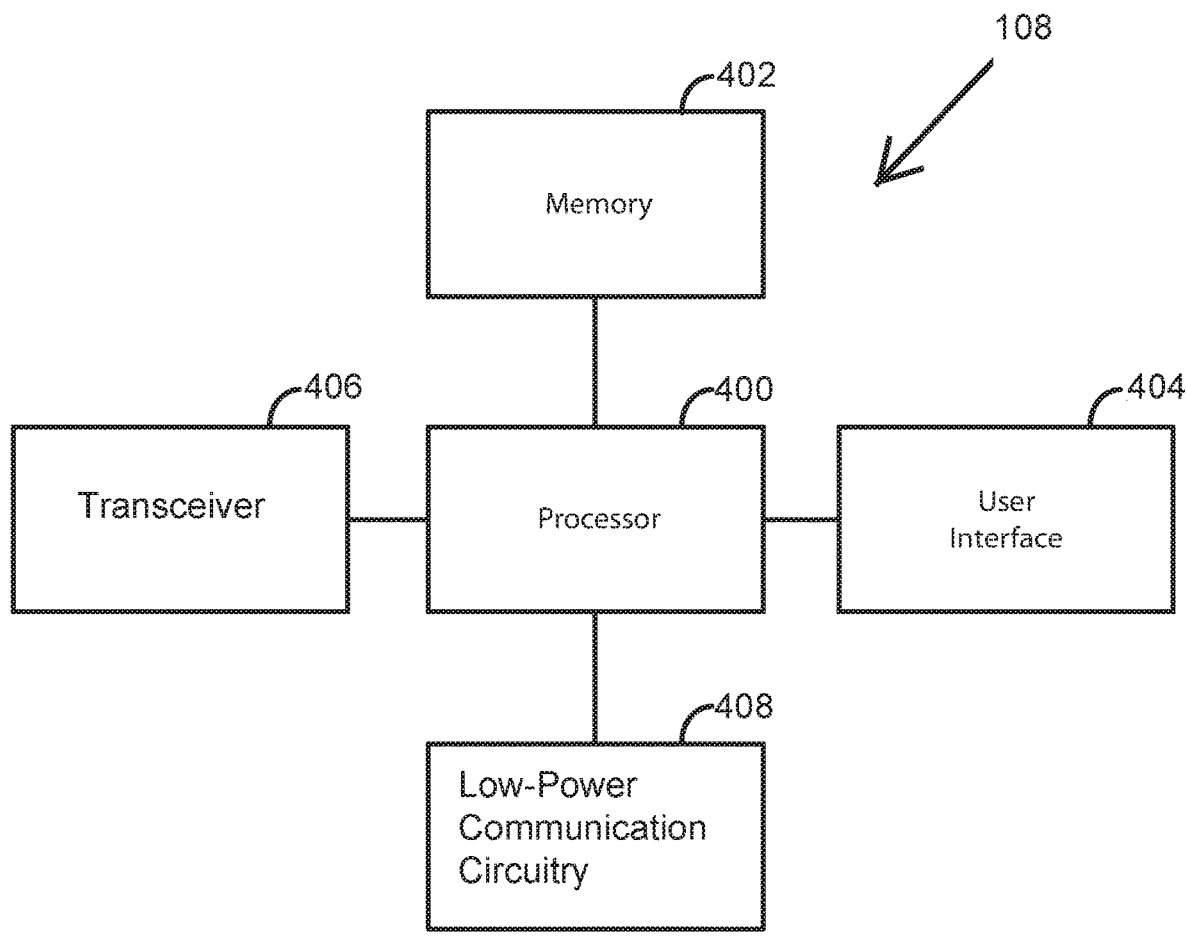
FIG. 4 is a functional block diagram of one embodiment of a mobile device as shown in FIG. 1.

FIG. 4 is a functional block diagram of one embodiment of mobile device 108, showing processor 400, memory 402, user interface 404, transceiver 406 and low-power communication circuitry 408. It should be understood that the functional blocks shown in FIG. 4 may be connected to one another in a variety of ways, and that not all functional blocks necessary for operation of mobile device 108 are shown (such as a power supply), for purposes of clarity.

Processor 400 is configured to provide general operation of mobile device 108 by executing processor-executable instructions stored in memory 400, for example, executable code. Processor 400 typically comprises one or more microprocessors, microcontrollers, or custom ASICs that provide communications functionality to mobile device 108 as well as to execute instructions that provide an ability for personal communication device to determine modified temperature profiles and communicate with server 110 and thermostat 106.

Memory 402 comprises one or more non-transient information storage devices, otherwise referred to as one or more processor-readable mediums, such as RAM, ROM, flash memory, SD memory, XD memory, or virtually any other type of electronic, optical, or mechanical memory device. Memory 402 is used to store the processor-executable instructions for general operation of mobile device 108 and for storing a software application or "app" that interacts with a user in order to provide certain information to server 110, such as user account information and information about thermostat 106, as well as to relay communications between server 110 and thermostat 106.

User interface 404 is coupled to processor 400, allowing a user to control typical functions of mobile device 108, including making and receiving phone calls, sending and receiving text messages, and interacting with apps. User interface 400 may comprise one or more pushbuttons, touchscreen devices, electronic display devices, lights, LEDs, LCDs, biometric readers, switches, sensors, keypads, microphones, speakers, and/or other human interface devices. A very popular user interface device today is a touchscreen device.

Transceiver 406 comprises circuitry necessary to transmit and receive information to/from server 110, either via wide-area network 114, cellular network 116, or both. In some embodiments, more than one transceiver is present, for example, a cellular transceiver and a Wi-Fi transceiver. Such circuitry is generally well known in the art.

Low-power communication circuitry 408 comprises electronic circuitry necessary to communicate directly, and wirelessly, with thermostat 106, i.e., without the use of an intermediary system such as a home Wi-Fi network. Such communication circuitry 408 may comprise one or more discreet components, integrated circuits, ASICs, or other circuitry well-known in the art for low-power communications directly with thermostat 106, such as BLE, NFC, or other well-known communication circuitry.

FIG. 5 is a flow diagram of one embodiment of a method, performed by thermostat 106, server 110 and mobile device 108 for controlling thermostat 106 over a wide-area network that is not in communication with a local or wide-area network. It should be understood that the steps described in this method could be performed in an order other than what is shown and discussed and that some minor method steps may have been omitted for clarity and simplicity. It should also be understood that the functionality described in this method by server 110 could be performed by mobile device 108.

At block 500, a user initiates contact with server 110 in order to register thermostat 106 with server 110 so that server 110 can provide one or more temperature profiles to thermostat 106, and for thermostat 106 to provide information to server 110 for use in generating the temperature profiles, in some embodiments. The user launches an app running on mobile device 108 that provides communications with server 110 and thermostat 106. Once connected to server 110, the user may provide server 110 with initial contact information such as information about the user (i.e., name, date of birth), structure 100 (i.e., location), thermostat 106 (make, model), billing information, contact information (physical address, email address, phone number), a utility account number and access code, etc.

At block 502, processor 300 within server 110 receives the initial contact information from mobile device 108 and, in response, creates an account associated with the user in memory 302. The account creates an association between thermostat 106 and mobile device 108, as well as all of the data stored within the account.

At block 504, processor 300 receives time-of-use pricing information from one or more utilities, such as utility 120. This information may be provided to processor 300 via network interface 304 or by programming server 110 via a user interface (not shown). In one embodiment, server 110 receives time-of-use pricing information from a large number of utilities at regular time intervals, such as once per month, or the information is "pushed" to server 110 whenever a change in time-of-use pricing information is effectuated by a utility. In another embodiment, in response to receiving the initial contact information, or at some later time, processor 300 determines a location of structure 100/thermostat 106, and determines a utility that services that location. Then, processor 300 queries the utility, via network interface 304, to provide time-of-use pricing information. In a related embodiment, processor 300 uses a utility account number provided by mobile device 108 to determine a utility associated with thermostat 106. In any case, processor 300 stores the time-of-use pricing information for each utility in memory 302 and, in some cases, associates a particular time-of-use pricing information with any user account having a location serviced by a particular utility that provided the particular time-of-use pricing information. In one embodiment, along with the time-of-use pricing information, processor 300 receives geographical information from each utility, specifying a geographic boundary where service is offered, such as one or more zip codes, or mapping information.

At block 506, processor 300 receives past and/or current weather conditions and/or weather forecasts from weather server 112. This information is received via network interface 304, either at regular time intervals or upon a material change in forecast by weather server 112. While only one weather server 112 is shown in FIG. 1, in actuality there may be hundreds of such weather servers, each providing weather-related data for a particular geographic area. Past and current weather conditions may comprise temperatures, wind speeds and directions, humidity levels and other weather-related information related to one or more particular geographic regions. The weather forecasts may comprise predicted temperatures, predicted wind speeds and directions, predicted humidity levels and other predicted weather-related information related to one or more particular geographic regions. In one embodiment, in response to receiving the initial contact information, or at some later time, processor 300 determines a location of structure 100/thermostat 106, and determines a weather server that provides weather information pertaining to that location. Then, processor 300 queries the server, via network interface 304, to provide past and/or current weather conditions and/or weather forecasts. In any case, processor 300 stores the conditions/forecasts in memory 302 and, in some cases, associates a particular conditions/forecast with any user account having a location covered by the conditions/forecasts. In one embodiment, along with the conditions/forecasts, processor 300 receives geographical information specifying a geographic area where the conditions/forecasts pertain, such as one or more zip codes, or mapping information.

At block 508, mobile device 108 may program thermostat 106 with a temperature profile, where the temperature profile is provided directly from mobile device 108 to thermostat 106 via low-power communication circuitry 408 when mobile device 108 is within range of thermostat 106. In another embodiment, a user enters a temperature profile into thermostat 106 using user interface 206. In this case, the temperature profile may be provided from thermostat 106 to mobile device 108 when mobile device 108 is within range of thermostat 106.

At block 510, mobile device 108 may provide the temperature profile to server 110, along with identifying information for processor 300 to store the temperature profile in memory 302 in an account associated with mobile device 108, a user, or thermostat 106.

At block 512, thermostat 106 may additionally provide historical data to mobile device 108 in the form of previous actual temperatures measured by thermostat 106, determinations by thermostat 106 whether various temperature set points were reached within given ramp times, humidity levels, past energy usage and/or associated billing information, HVAC usage data (such as the times when a fan is turned on and off, the times when a compressor is active, and/or the times when a furnace is active), and previous temperature profiles used by thermostat 106. The historical data is provided to mobile device 108 via low-power communication circuitry 204 when mobile device 108 is within range of thermostat 106. Mobile device 108 may provide this historical information at various times to server 110 and processor 300 may store it in the user account associated with mobile device 108, thermostat 106, structure 100 or a user.

At block 514, processor 300 determines a modified temperature profile for thermostat 106. The term "modified temperature profile", as used herein, comprises a set of one or more temperature settings and related set point times determined by server 110, based on either an already-existing temperature profile, or one generated without the use of an already-existing temperature profile. The modified temperature profile may be determined initially upon receipt of the initial information from mobile device 108, the time-of-use pricing information and the conditions/forecast information pertaining to the location of thermostat 108 or structure 100. Alternatively, or in addition, the modified temperature profile may be calculated at regular time intervals, such as once per day, and/or upon a material change of the time-of-use pricing information and/or the conditions/forecast information.

In one embodiment, processor 300 determines a modified temperature profile by first retrieving a baseline temperature profile from memory 302. The baseline profile may comprise a temperature profile provided by mobile device 108, or a predefined temperature profile based on average temperatures and average temperature settings for homes in particular geographic areas. In other embodiments, processor 300 does not use a baseline profile, and builds a temperature profile from scratch. Such baseline temperature profiles, each covering a particular geographic region, may be pre-stored in memory 302 by an operator of server 110, taking into account expected average outdoor temperatures in each geographic region and the time of year. The baseline temperature profile may comprise set times and temperatures, as discussed above.

After the baseline temperature profile has been retrieved, processor 300 may retrieve a weather forecast, either from memory 302 or from weather server 112, associated with the location of thermostat 106, structure 100 or the user or user account. The weather forecast may be used to modify the baseline temperature profile (or create a new, modified temperature profile) to account for expected, changing weather conditions. For example, if the outdoor temperature where thermostat 106 is located is expected to cool significantly over the next 48 hours, processor 300 may create or modify a ramp time when a heating cycle should begin on the morning just before the cold weather is due to arrive, by beginning a heating cycle earlier than the baseline time indicates. For example, if the baseline temperature profile indicates a temperature setpoint of 73 degrees, and a heating time starting at 6:45 am, processor 300 may modify the start time to begin at 6:15 am if the weather forecast calls for cold temperatures below a predetermined threshold, which could be an absolute temperature (i.e., 65 degrees), or a temperature differential between an average temperature and a forecasted temperature (i.e., 5 degrees). If a warming trend will be occurring in the next several days, processor 300 may alter the baseline temperature profile to begin a heating cycle later than the baseline ramp start time, or begin a cooling cycle earlier than the baseline ramp start time. Alternatively, or in addition, a ramp end time can be adjusted by processor 300 to achieve the same goal.

Alternatively or in addition to adjusting a temperature ramp start time, processor 300 may adjust a setpoint temperature in response to time-of-use pricing information and/or weather forecasts. Using the example above, in one embodiment, processor 300 may decrease the temperature setpoint from 73 degrees to 72 degrees in order that the ramp time be minimized, as well as to conserve energy by setting the temperature setpoint at 72.

Alternatively, or in addition to the above, processor 300 may factor time-of use pricing information into the modified temperature profile. For example, if the price of electricity increases during 4 pm and 9 pm, processor 300 may attempt to cool structure 100 during off-peak hours, in order to conserve the amount of electricity used during peak hours. For example, during summertime, if the baseline temperature profile indicates a temperature of 72 degrees at 5:30 pm, with a ramp start time of 5:00 pm, processor 300 may calculate a new ramp start time of 3 pm, in order to start cooling structure 100 early, before 4 pm when the price of electricity increases. In this way, the price of cooling structure 100 will be reduced.

In another example, if a weather forecast indicates that a heat wave will arrive in three days, with temperatures averaging ten degrees above normal summer temperatures in the location of thermostat, lasting seven days, processor 300 may alter one or more temperature setpoints in the baseline temperature profile by calculating an estimated cost of using the baseline temperature profile and then calculating one or more modified temperature profiles having one or more of the temperature setpoints increased. For example, continuing the example from above, if the baseline temperature profile comprises a setpoint of 72 degrees at 5:30 pm, with a cooling ramp start time of 5:00 pm, processor first estimates how much it would cost to cool structure 100 using this information in conjunction with the time-of-use pricing information. Processor 300 can base this calculation off of historical information originating from thermostat 106. In other words, processor 300 can evaluate the historical information and determine that when it is actually one hundred degrees at 5 pm at the location of thermostat 106, structure 100 was not cooled to the desired temperature set point within the ramp time, but that structure 100 was cooled to the temperature set point at 6 pm. Thus, processor 300 can determine an estimated time that cooling must be active in order to achieve the desired temperature setpoint, as well as a cost, based on the time-of-use pricing information. Processor 300 can then estimate a cost associated with altering the ramp start time to a time earlier than the baseline start time and, assuming structure 100 reaches the desired temperature set point at 5:30, calculate a cost to cool structure 100 based on the extended ramp time during off-peak hours, and to maintain such a temperature during peak hours. Processor 300 can then determine whether the modified temperature profile would save money on cooling costs.

In another embodiment, processor 300 may alter one or more temperature setpoints, additionally or alternatively to altering one or more temperature ramp start times. In this embodiment, a setpoint may be altered based, again, on past and/or present weather conditions and/or forecasts and/or on time-of-use pricing information pertinent to the location of thermostat 106. For example, if the weather forecast calls for colder weather than usual, i.e., less than a predetermined temperature threshold or temperature differential, processor 300 may estimate the cost of heating structure 100, based on the time-of-use pricing information and, in one embodiment, the historical data from thermostat 106 and historical weather data from weather server 112. For example, near the beginning of December, processor 300 may retrieve historical data from memory 302 to determine an amount of energy used to heat structure 100 during the previous December, or to determine a cost to heat structure 100 the previous December by retrieving historical billing information for structure 100 from an account stored in memory 302 or utility 120. Processor 300 may, in addition, retrieve a temperature profile that was active during the previous December by retrieving such a temperature profile from memory 302. Processor 300 can associate the cost to heat structure 100 to the historical temperature data and compare forecasted temperatures for the following month to estimate the cost to heat structure 100 for the month, based on the time-of-use pricing information. If the forecast indicates that the month will be colder than the previous year, processor 300 can generate a modified temperature profile, in one embodiment, based on the previous temperature December profile, to alter one or more setpoints to a lower temperature setting, in order to approximate the cost of heating structure 100 in the previous December.

In another example, processor 300 determines a modified temperature profile by comparing a desired monthly energy cost, previously provided by a user utilizing the app on mobile device 108, to a month-to-date estimate of energy usage costs. In this example, the term "monthly" is used to either denote a colander month, or a monthly billing cycle. The user could provide a desired monthly utility cost for each month of the year, and the desired monthly utility costs could be stored in the user's account in memory 302. Processor 300 can estimate a month-to-date cost for heating or cooling structure 100, based on the month-to-date HVAC data received from mobile device 108 in connection with the time-of-use pricing information, or directly from utility 120, using the user's account number and passcode stored in memory 302. Processor then can estimate the month's utility cost using the month-to-date usage/cost information plus a remaining monthly cost based on one or more weather forecasts and the time-of-use pricing information. For example, knowing the predicted temperatures for the remaining portion of a month, processor 300 can estimate a remaining monthly utility cost by comparing the predicted temperatures with past actual temperatures provided by weather server 112 and previous costs to heat or cool structure 100, based on previous utility bills. Processor 300 may search memory 302 to identify past temperatures most closely matching the predicted temperatures, and identify a past utility bill covering the period of the past temperatures most closely matching the forecast. Then, processor 300 may estimate the remaining billing cycle cost by calculating a daily average utility cost for the previous billing cycle, then multiplying that figure by the number of days remaining in the billing cycle. If the estimated cost of the monthly utility bill exceeds the desired monthly utility cost, processor 300 can adjust one or more temperature setpoints in a modified temperature profile to reduce the expected energy usage of the HVAC system. The amount of change to the one or more setpoints to achieve the desired monthly utility cost may be determined by a trial-and-error process, favoring small changes in order to avoid uncomfortable temperatures inside structure 100. For example, after adjusting one or more setpoints, and providing the modified temperature profile to thermostat 106 via mobile device 108 (described below), processor 300 may receive updated HVAC usage information from thermostat 106 via mobile device 108, or from utility 120 and determine whether usage/cost was reduced by an amount to meet the desired monthly utility cost, based on continuing with the current modified temperature profile that was provided to thermostat 106. If the resulting usage/cost savings is not enough to achieve the desired monthly utility cost, processor 300 may again adjust one or more temperature setpoints in the modified temperature profile, and send this updated modified temperature profile to thermostat 106. This process may be repeated until processor 300 determines that the latest temperature setpoints will achieve the desired monthly utility cost, based on the weather forecast.

In yet another embodiment, server 110 may generate a modified temperature profile based on a determination, from utility 120 or related entity, that utility demand is, or is expected to, exceed supply. In these circumstances, it is desirable to change the temperature profile on a large number of thermostats in an area served by utility 120 to conserve utility resources and avoid brownout or blackouts. Processor 300 may receive notice from utility 120 of such a supply/demand imbalance and, in response, generate a modified temperature profile that raises one or more temperature setpoints during hot weather and lowers one or more temperature setpoints during cold weather. Processor 300 may raise or lower one or more temperature setpoints by a predetermined amount, such as 5% or 2 degrees initially, then readjust one or more temperature setpoints if another notice from utility 120 to further reduce energy consumption.

At block 516, after processor has modified the baseline temperature profile, creating a modified temperature profile, processor 300 provides the modified temperature profile to mobile device 108. Processor 300 provides the modified temperature profile to mobile device 108 in accordance with adjustments made to ramp start times, stop times, and temperature setpoints. For example, if a weather forecast has predicted a cold front to arrive in three days, and processor 300 modifies at least one ramp start time, stop time, or temperature setpoint as a result of the cold front, processor 300 may provide the modified temperature profile to mobile device 108 just before arrival of the cold front, i.e., after a scheduled temperature set point time has passed before arrival of the cold front, and before the scheduled temperature set point time arrives on a day that the cold front arrives. Processor 300 provides the modified temperature profile to mobile device 108 via wide-area network 114 and/or cellular network 116.

At block 518, mobile device 108 receives the modified temperature profile and stores it in memory 402 until mobile device 108 is within range of thermostat 106.

At block 520, processor 400 determines that mobile device 108 is within range of thermostat 106, in one embodiment, by scanning for an "advertisement package" transmitted periodically by thermostat 106. When processor 400 receives an advertising package via low-power communication technology 408, processor 400 determines that mobile device 108 is within range of thermostat 106. In response, processor 400 may initiate a communication with thermostat 106 using low-power communication circuitry 408. Alternatively, processor 400 causes low-power communication circuitry 408 to periodically broadcast advertising packages, and thermostat 106 determines that mobile device 108 is within range when thermostat 106 receives the advertising package. In response, thermostat 106 may initiate a communication with mobile device 108 using low-power communication circuitry 204. Other methods may be used to determine proximity, as is well-known in the art.

At block 522, in response to determining that mobile device 108 is within range of thermostat 106, processor 400 checks memory 402 to determine if any modified thermostat profiles have been stored. If so, processor 400 retrieves the modified thermostat profile and transmits it via low-power communication circuitry 408 directly to thermostat 106.

At block 524, processor 200 within thermostat 106 may check memory 202 to determine if there is any historical information ready for transmission to mobile device 108. If so, processor 200 causes the historical information to be transmitted to mobile device 108 via low-power communication circuitry 204.

At block 526, mobile device 108 provides the historical information to server 110, for use in future modifications to the modified temperature profile.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A server for controlling a thermostat over a wide-area network, comprising:
   a memory for storing time-of-use pricing information, a temperature profile and processor-executable instructions, wherein the time-of-use pricing information comprises energy pricing for one or more time periods;
   a network interface for communicating with a mobile device over the wide-area network, the mobile device associated with the thermostat; and
   a processor coupled to the memory and the network interface, for executing the processor-executable instructions that causes the server to:
   determine a predicted outdoor temperature where the thermostat is located;

modify the temperature profile based on the time-of-use pricing information and the predicted outdoor temperature to produce a modified temperature profile; and provide the modified temperature profile to the mobile device associated with the thermostat for the mobile device to provide the modified temperature profile to the thermostat.

2. The server of claim 1, wherein the processor-executables that cause the server to determine a predicted outdoor temperature where the thermostat is located comprises instructions that cause the server to:

determine, by the processor, a location of the thermostat;

receive, by the processor via the network interface, a weather forecast for an area that includes the location of the thermostat from a weather server; and determine, by the processor, the predicted outdoor temperature from the weather forecast.

3. The server of claim 1, wherein the processor-executable instructions that cause the server to determine the location of the thermostat and to provide the modified temperature profile to the mobile device associated with the thermostat comprises instructions that cause the server to:

receive, by the processor via the network interface, a request from the mobile device to create an account associated with the thermostat;

in response to receiving the request, create an account and store the account in the memory;

receive, by the processor via the network interface, a geographic location of the thermostat and contact information associated with the mobile device;

store, by the processor in the memory, and the geographic location of the thermostat and contact information;

retrieve, by the processor, the geographic location and the contact information from the memory; and provide, by the processor via the network interface, the modified temperature profile to the mobile device in accordance with the contact information.

4. The server of claim 1, wherein the instructions that cause the server to modify the temperature profile comprises instructions that cause the server to:

modify, by the processor, a temperature ramp start time when the predicted weather forecast indicates that the predicted outdoor temperature will exceed a predetermined threshold during a first time period.

5. The server of claim 1, wherein the instructions that cause the server to modify the temperature profile comprises instructions that cause the server to:

modify, by the processor, a temperature set point when the predicted weather forecast indicates that the predicted outdoor temperature will exceed a predetermined threshold during a first time period.

6. The server of claim 4, wherein the processor-executable instructions that cause the server to provide the modified temperature profile to the mobile device associated with the thermostat comprises instructions that cause the server to:

provide the modified temperature profile to the mobile device after a scheduled temperature set point time has passed, and before the scheduled temperature set point time arrives on a day that the predicted outdoor temperature will exceed the predetermined threshold.

7. The server of claim 1, wherein the processor-executable instructions that cause the server to modify the temperature profile based on the time-of-use pricing information and the predicted outdoor temperature comprises instructions that cause the server to:

determine, by the processor, a first cost to heat or cool a structure where the thermostat is located during a first time period using the temperature profile and the time-of-use pricing information;

determine, by the processor, a second cost to heat or cool the structure during the first time period using the modified temperature profile and the time-of-use pricing information; and provide, by the processor via the network interface, the modified temperature profile to the mobile device when the second cost is less than the first cost.

8. A mobile device for direct communications a thermostat that is not in communication with a local-area network, comprising:

a memory for storing modified temperature profile and processor-executable instructions, the modified temperature profile for replacing a temperature profile stored by the thermostat;

a network interface for receiving a modified temperature profile from a remote server over a wide-area network;

low-power communication circuitry for communicating directly with the thermostat; and a processor coupled to the memory, the network interface and the low-power communication circuitry, for execution of the processor-executable instructions that causes the mobile device to:

receive, by the processor via the network interface, the modified temperature profile from the remote server;

determine, by the processor, that the mobile device is within range of the thermostat; and provide, by the processor via the low-power communication circuitry, the modified temperature profile to the thermostat when the mobile device is in range of the thermostat.

9. The mobile device of claim 8, wherein the modified temperature profile comprises a temperature profile that defines HVAC turn-on and turn-off times and associated temperature set points.

10. The mobile device of claim 8, wherein the modified temperature profile is optimized for time-of-use utility pricing, determined by the remote server.

11. The mobile device of claim 8, wherein the modified temperature profile is optimized for time-of-use utility pricing in anticipation of predicted outdoor temperatures.

12. The mobile device of claim 8, comprising further processor-executable instructions that causes the mobile device to:

receive, by the processor via the low-power communication circuitry, registration information from the thermostat, the registration information comprising identification information identifying a model of the thermostat;

wherein the processor-instructions that cause the mobile device to provide the modified temperature profile to the thermostat comprise instructions that cause the mobile device to:

generate, by the processor, one or more messages, the one or more messages comprising the modified temperature profile formatted for receipt by the thermostat in accordance with the model of the thermostat.

13. The mobile device of claim 8, comprising further processor-executable instructions that causes the mobile device to:

receive, by the processor via the low-power communication circuitry, registration information from the thermostat, the registration information comprising identification information identifying a model of the thermostat and contact information identifying the mobile device; and provide, by the processor via the network interface, the registration information and the contact information to the remote server;

wherein the modified temperature profile is received by the processor, via the network interface, formatted by the remote server in accordance for receipt by the thermostat in accordance with the registration information.

14. A processor-readable medium tangibly embodying processor-executable instructions that cause a mobile device to perform a method, comprising:

receiving, by a processor via a network interface, modified temperature profile from a remote server;

determining, by the processor, that the mobile device is within range of the thermostat; and providing, by the processor via a low-power communication circuitry, the modified temperature profile to the thermostat when the mobile device is in range of the thermostat.

15. The processor-readable medium of claim 14, wherein the modified temperature profile comprises a temperature profile that defines HVAC turn-on and turn-off times and associated temperature set points.

16. The processor-readable medium of claim 14, wherein the modified temperature profile is optimized for time-of-use utility pricing, determined by the remote server.

17. The processor-readable medium of claim 14, wherein the modified temperature profile is optimized for time-of-use utility pricing in anticipation of predicted outdoor temperatures.

18. The processor-readable medium of claim 14, comprising further processor-executable instructions that causes the mobile device to perform the following method:

receiving, by the processor via the low-power communication circuitry, registration information from the thermostat, the registration information comprising identification information identifying a model of the thermostat;

wherein the processor-instructions that cause the mobile device to provide the modified temperature profile to the thermostat comprise instructions that cause the mobile device to:

generating, by the processor, one or more messages, the one or more messages comprising the modified temperature profile formatted for receipt by the thermostat in accordance with the model of the thermostat.

19. The processor-readable medium of claim 14, comprising further processor-executable instructions that causes the mobile device to perform the following method:

receiving, by the processor via the low-power communication circuitry, registration information from the thermostat, the registration information comprising identification information identifying a model of the thermostat and contact information identifying the mobile device; and providing, by the processor via the network interface, the registration information and the contact information to the remote server;

wherein the modified temperature profile is received by the processor, via the network interface, formatted by the remote server in accordance for receipt by the thermostat in accordance with the registration information.

* * * * *